United States Patent [19]

Sugiura

[11] Patent Number: 4,775,868
[45] Date of Patent: Oct. 4, 1988

[54] RECORDING APPARATUS

[75] Inventor: Susumu Sugiura, Yamato, Japan

[73] Assignee: Canon Kabushiki Kaisha, Tokyo, Japan

[21] Appl. No.: 134,561

[22] Filed: Dec. 15, 1987

Related U.S. Application Data

[63] Continuation of Ser. No. 22,126, Mar. 5, 1987, abandoned, which is a continuation of Ser. No. 482,891, Apr. 7, 1983, abandoned.

[30] Foreign Application Priority Data

Apr. 19, 1982 [JP] Japan .................................. 57-63997
Apr. 20, 1982 [JP] Japan .................................. 57-64707

[51] Int. Cl.⁴ .......................... G01D 9/28; B41J 3/20; H04N 1/23
[52] U.S. Cl. ........................................ 346/46; 346/75; 346/76 PH; 346/140 R; 358/75; 358/296; 400/120; 400/126; 400/124
[58] Field of Search .......... 346/46, 75, 76 PH, 140 R; 358/75, 296; 400/120, 124, 126

[56] References Cited

U.S. PATENT DOCUMENTS

| | | | |
|---|---|---|---|
| 4,178,597 | 12/1979 | Isayama et al. | 346/75 X |
| 4,279,199 | 7/1981 | Blanco et al. | 101/93.05 X |
| 4,313,684 | 2/1982 | Tazani et al. | 400/322 X |
| 4,364,067 | 12/1982 | Koto et al. | 346/140 R |
| 4,386,861 | 6/1983 | Kurihana et al. | 400/124 |
| 4,394,693 | 7/1983 | Shirley | 358/298 |
| 4,403,874 | 9/1983 | Payne et al. | 400/124 X |
| 4,415,911 | 11/1983 | Tazani | 346/140 R |
| 4,463,359 | 7/1984 | Ayata et al. | 346/1.1 |

Primary Examiner—E. A. Goldberg
Assistant Examiner—Gerald E. Preston
Attorney, Agent, or Firm—Fitzpatrick, Cella, Harper & Scinto

[57] ABSTRACT

A recording apparatus with plural recording units, such as an ink jet printer with plural ink jet recording heads, in which the number of flexible cables and the number of signal lines for driving the plural recording units are reduced by the common use of said signal lines for plural recording units.

14 Claims, 4 Drawing Sheets

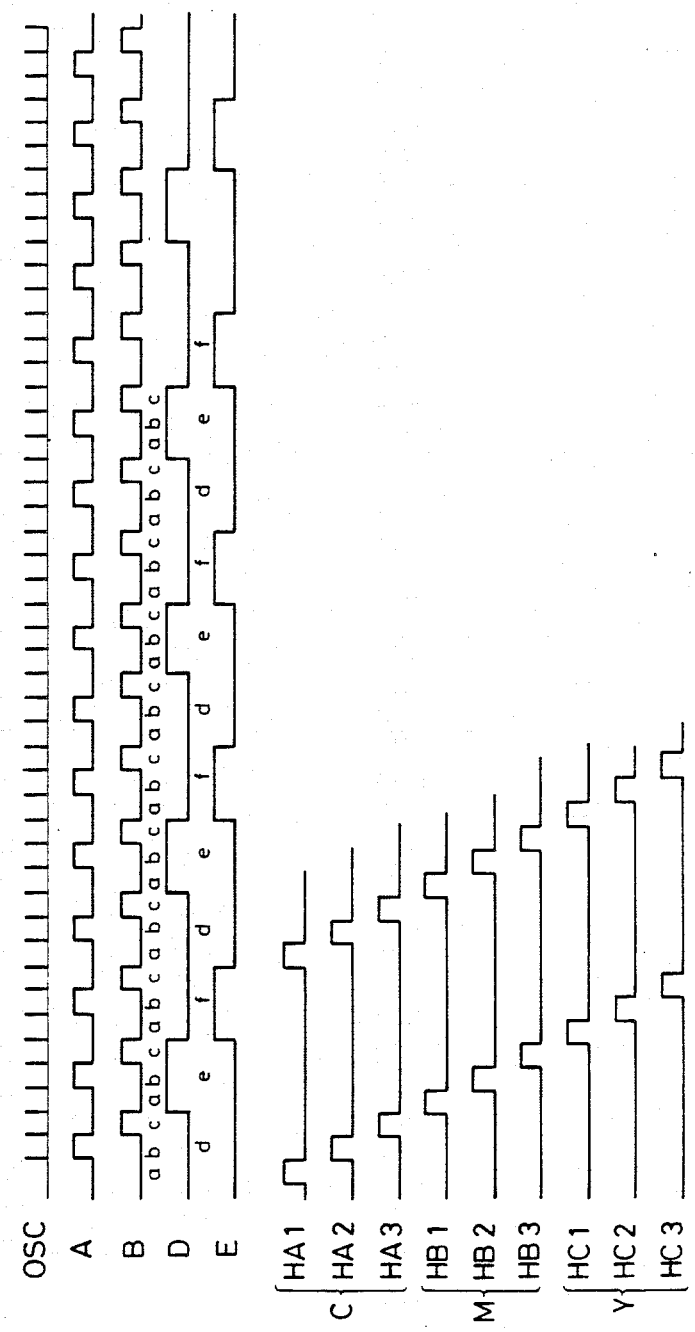

RECORDING APPARATUS

This application is a continuation of application Ser. No. 022,126 filed Mar. 5, 1987, now abandoned, which is a continuation of application Ser. No. 482,891, filed Apr. 7, 1983, now abandoned.

BACKGROUND OF THE INVENTION

1. Field of the Invention

The present invention relates to a recording apparatus provided with plural recording units.

2. Description of the Prior Art

There is already known a printer with plural multi-recording heads, such as a color ink jet printer equipped with multiple nozzle heads. In such printer, as schematically illustrated in FIG. 1, a carriage 1 is provided with first to fourth multiple nozzle heads 2-1- 2-4 arranged from left to right, for respectively emitting inks of cyan (C), magenta (M), yellow (Y) and black (K) colors. Said multiple nozzle heads receive the supply of corresponding inks through flexible tubes 3 connected to ink reservoirs 4, and also receive the supply of driving voltages through flexible cables 5-1- 5-4 respectively incorporating plural signal wires, a connector plate 6 and a united power supply cable 7. The carriage 1 of the above-described structure is supported by a pair of rails 8 and an endless belt 9 connected to said carriage 1 is driven by a stepping motor 10 to reciprocate said carriage 1 along a direction X shown in the illustration thereby achieving the main scanning, while a recording sheet 12 extended between paired rollers 13, 14 is advanced in a direction Y by means of a stepping motor 15 linked to said paired rollers 14 to achieve subsidiary scanning, and a color image is recorded on said recording sheet 12 by the colored inks emitted from said multiple nozzle heads 2-1- 2-4. On both ends of the reciprocating path of the carriage 1 there are provided stoppers 11-1, 11-2 to define the extent of the main scanning. h) In such known color ink jet printer of the above-described structure, the plural multiple-nozzle heads 2-1- 2-4 provided on the carriage 1 are respectively provided with separate flexible cables 5-1- 5-4, the existence of which gives rise to a significant load to the reciprocating motion of the carriage 1. Besides, as each flexible cable contains a large number of parallel wires paired for driving plural ink nozzles present in the multiple nozzle head, an extremely cumbersome operation has been needed for connecting the densely arranged ends of said wires exactly with the contact terminals of the multiple-nozzle head and for connecting plural flexible cables in precisely defined overlapping position with the contacts provided on the connector plate 6.

SUMMARY OF THE INVENTION

In consideration of the foregoing description, an object of the present invention is to provide a recording apparatus capable of driving plural recording units with a simple structure.

Another object of the present invention is to provide a recording apparatus allowing reduction of the number of power supply means to plural recording heads.

Still another object of the present invention is to provide a recording apparatus allowing the use of only one power supply cable to be connected to the carriage performing reciprocating motion with plural multi-recording heads thereby significantly reducing the mechanical load to such reciprocating motion, and further allowing reduction of the number of wires to be incorporated in said single power supply cable.

Still another object of the present invention is to provide a recording apparatus allowing the use of only one power supply cable to be connected to the carriage performing reciprocating motion with plural multi-recording heads thereby significantly reducing the mechanical load to such reciprocating motion, further allowing reduction of the number of wires to be incorporated in said single power supply cable, and still allowing an increase in the number of recording elements receiving such power supply.

The foregoing and still other objects of the present invention will become fully apparent from the following description.

BRIEF DESCRIPTION OF THE DRAWINGS

FIG. 4 is a waveform chart showing the function of various parts of said power supply unit.

DETAILED DESCRIPTION OF THE PREFERRED EMBODIMENTS

Now the present invention will be clarified in detail by the following description which is to be taken in conjunction with the attached drawings.

Figure 1:
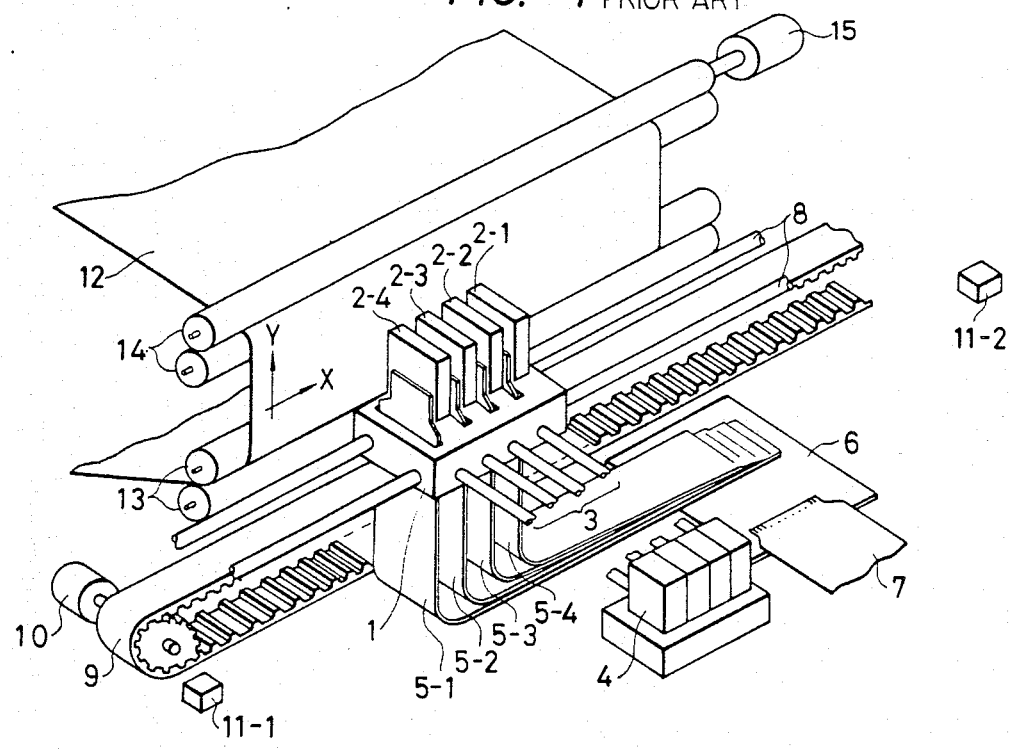
FIG. 1 is a schematic perspective view showing the structure of printing mechanism in a conventional color ink jet printer.
Figure 2:
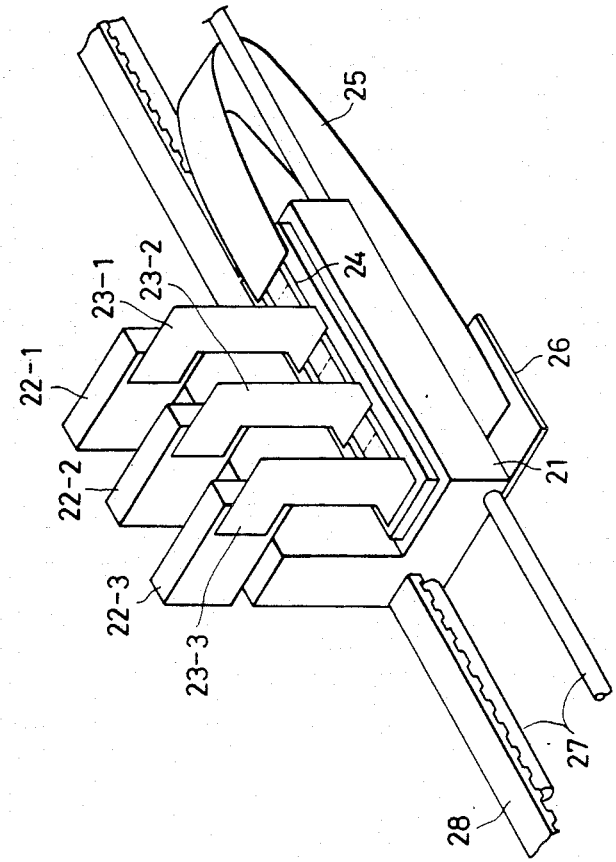
FIG. 2 is a perspective view showing the essential part of a printing mechanism embodying the present invention.

Reference is at first made to FIG. 2 showing the essential part of a printing mechanism embodying the present invention. On a carriage 21 supported by guide rails 27 and performing reciprocating motion by an endless belt 28, there are shown three multiple nozzle heads 22-1, 22-2, 22-3 for emitting inks respectively of cyan (C), magenta (M) and yellow (Y) colors. The driving terminals of plural ink nozzles provided on said multiple nozzle heads are connected, through power supply cables 23-1- 23-3, to a relaying terminal plate 24 provided on said carriage 21, and terminals provided at an end of said terminal plate 24 are connected to the wires of a flexible cable 25 the other end of which is connected to a fixed connector plate 26. It will be understood that the above-described structure is significantly simpler and lighter than the conventional structure shown in FIG. 1. Said single flexible cable 25 is provided with driving voltage supply lines of a number equal to that of ink nozzles in each multiple nozzle head common power supply lines each of which is used commonly for the array of ink nozzles in each multiple nozzle head, wherein each of said driving voltage supply lines is commonly connected to the ink nozzles of the same ordinal number in different multiple nozzle heads 22-1- 22-3 and is used on a time-sharing basis for said different multiple-nozzle heads in the manner to be explained in the following.

Figure 3:
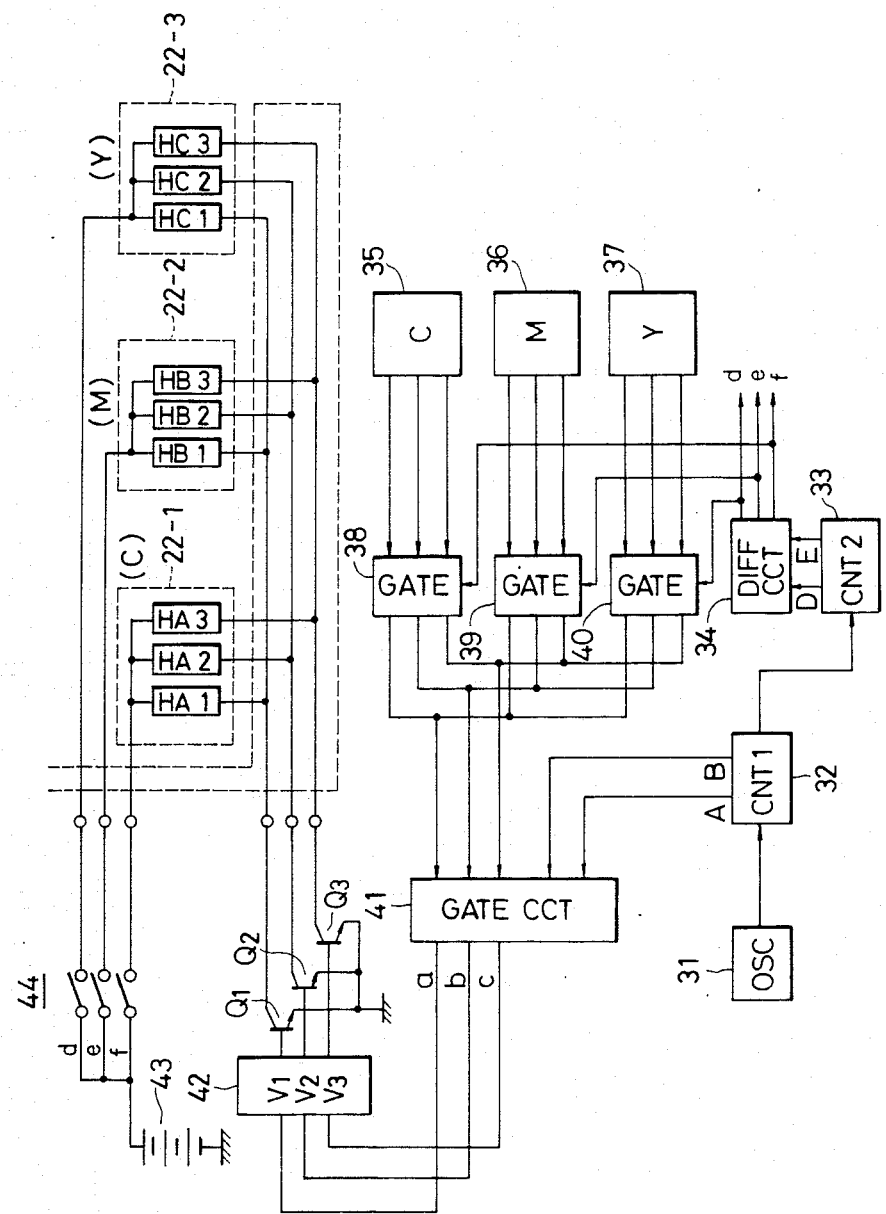
FIG. 3 is a block diagram showing a power supply unit for the multiple nozzle head embodying the present invention.

FIG. 3 shows an embodiment of the circuit for power supply to the ink nozzle heads utilizing each driving voltage supply line in the single flexible cable 25 on a time-sharing basis for plural heads, i.e. three heads 22-1- 22-3 in the illustrated example, and FIG. 4 shows various signals in said circuit. In said circuit, a clock oscillator OSC 31 (OSC) generates clock pulses of a clock interval substantially equal to the ink emitting time of each nozzle as illustrated by a waveform OSC shown in FIG. 4, and said clock pulses are counted by counters 32 (CNT1) and 3 (CNT2) to generate gate pulses A, B having a pulse duration equal to one clock interval and a pulse interval equal to three clock intervals with mutual phase difference equal to one clock interval as respectively shown by waveforms A, B in FIG. 4, and gate pulses D, E having a pulse duration equal to three clock intervals and a pulse interval equal to nine clock intervals with mutual phase difference equal to three clock intervals as respectively shown by waveforms D, E in FIG. 4. Said gate pulses D, E are supplied to a differentiating circuit 34 to generate switching pulses d, e, f of an interval equal to three clock intervals. On the other hand, each of image signal generators 35, 36, 37 for respecitvely generating image signals of cyan, magenta and yellow colors generates three complementary color image signals to be supplied to three nozzles of a complementary color in each of the multiple-nozzle heads 22-1, 22-2, 22-3. Said complementary color image signals are supplied to gate circuits 38, 39, 40 which respectively receive said switching pulses d, e, f for transmitting each of said three complementary color image signals for a period of three clock intervals in sequence but commonly to a gate circuit 41. Said gate circuit 41 also receives the gate pulses A, B which are of a pulse duration equal to a clock interval and mutually have a phase difference equal to a clock interval from the counter 32 (CNT1) to transmit the complementary color image signals supplied in succession for respective period of three clock intervals in further divided duration corresponding to one clock interval. In this manner the signals for the nozzles HA-1, HA-2, HA-3 in the multiple-nozzle head 22-1 for emitting cyan ink those HB-1, HB-2, HB-3 in the multiple-nozzle head 22-2 for emitting magenta ink and those HC-1, HC-2, HC-3 in the multiple-nozzle head 22-3 for emitting yellow ink are transmitted in succession in this order for respective periods of one clock interval, then are converted into nozzle driving voltages V1, V2, V3 in a driving circuit 42 and are supplied, through power transistors Q1, Q2, Q3, in grouped manner to the mutually corresponding nozzles HA1– HC1, HA2– HC2, HA3– HC3 in the multiple-nozzle heads 22-1, 22-2, 22-3. The common terminals of said ink nozzles in each multiple nozzle head are connected to a contact d, e or f of a selector switch 44, which is actuated by the switching pulses d, e, f from the differentiating circuit 34, whereby the multiple-nozzle heads 22-1, 22-2, 22-3 are enabled in succession for respective period of 3 clock intervals. Consequently the ink nozzles are activated in succession with a cycle of 9 clock intervals during which each ink nozzle is activated for a duration of one clock interval, whereby each ink nozzle can be activated by a corresponding complementary color image signal even with the use of a single flexible cable 25 commonly connected to three multiple-nozzle heads.

In the above-described example it has been assumed that the carriage is provided with three multiple-nozzle heads each of which is provided with three ink nozzles, but it will be understood that the present embodiment is by no means limited to such numbers but is applicable also to any arbitrary numbers, thus enabling to drive multiple nozzles through the use of a single flexible cable commonly for plural multiple-nozzle heads.

Furthermore, in case the number of multiple-nozzle heads to be installed on a carriage and the number of ink nozzles to be incorporated in each multiple-nozzle head are further increased, it is also possible to further reduce the number of signal lines to be incorporated in the single flexible cable, even with the above-described structure of utilizing a single flexible cable commonly for plural multiple-nozzle heads and of connecting the ink nozzles of the same ordinal number in different multiple-nozzle heads. In such case it is not necessary to selectively activate only one ink nozzle at each clock interval but an image signal of a complementary color may be simultaneously supplied to plural ink nozzles for respectively emitting inks of mutually different colors, if the common terminals of the multiple-nozzle heads to which said plural ink nozzles belong are suitably changed over in a manner to enable only one head of a color corresponding to that of the supplied image signal.

The type of ink nozzle, such as the thermal dot nozzle, thermal nozzle or bubble jet nozzle to be employed in the color ink jet printer determines the limit energizing period as a function of temperature rise resulting from the activation of said ink nozzle and also determines the interval between activations in relation to the time required for the recovery of temperature, whereby the interval of energization and the duty ratio are determined for such ink nozzle. The process of the present invention allows an increase in the number of ink nozzles to be energized during such interval and to achieve uniform levels of currents in the lines embedded in the insulation of the flexible cable, thereby avoiding line breakage due to overheating and thereby reducing the load of each ink nozzle. More specifically, for this purpose, the circuit shown in FIG. 3 is so designed to satisfy the following equation:

$$m \times p/k \times t_a \leq t_a + t_b$$

wherein $t_a$ is the energizing time for each ink nozzle, $t_b$ is the interval between energizations, m is the number of nozzles in each multiple-nozzle head, p is the number of multiple-nozzle heads, and k is the number of nozzles to be simultaneously supplied with the signal.

More specifically, within a cycle time $(t_a + t_b)$ determined by the type of the ink nozzle, the nozzles are precisely selected in succession and the number of nozzles simultaneously receiving the signal is made as large as possible, while the load to each signal line and to each ink nozzle is rendered uniform and reduced.

As detailedly explained in the foregoing, the present invention allows the driving of plural multi-recording heads on a carriage through a single flexible cable and reduction of the number of signal lines in said single flexible cable, thereby significantly reducing the load to the carriage motion and to each signal line and enabling simplified and secure line connecting work.

It will also be understood that the present invention is not only applicable to a recording apparatus with plural recording heads but also to a recording apparatus with only one recording head equipped with plural recording elements.

Furthermore the present invention is applicable, in addition to the ink jet recording, to other recording methods such as thermal recording, thermal transfer recording and wire dot recording.

What I claim is:
1. Color image recording apparatus comprising:
   recording means including carriage-mounted reciprocative recording heads respectively allotted to different colors and arranged in a main scanning direction, each recording head being composed of a plurality of recording elements for recording in accordance with recording data;

a first group of signal lines for selecting one of said recording heads, the numbr of said first group of signal lines corresponding to the number of recording heads;

a second group of signal lines for selecting recording elements in one recording head, the number of said second group of signal lines corresponding to the number of recording elements in one recording head;

control means for sequentially selecting each line of said first group of signal lines and for sequentially selecting each line of said second group of signal lines so that the sequential selection for all of the lines of said second group can be completed while one line of said first group is selected;

first selection means for selecting a plurality of recording data in synchronism with the selection of said first group of signal lines; and second selection means for sequentially selecting recording data, selected by said first selection means, in synchronism with the selection of said second group of signal lines.

2. Color image recording apparatus according to claim 1, wherein said second group of signal lines carries a drive control signal representing whether or not a recording element is driven.

3. Color image recording apparatus according to claim 1, wherein said first group of signal lines makes connections between the recording elements and a power supply associated with the recording elements.

4. Color image recording apparatus according to claim 1, wherein said plurality of recording elements are arranged in a line perpendicular to the main scanning direction.

5. Color image recording apparatus, according to claim 1, wherein said recording heads are respectively adapted to record yellow, magneta and cyan.

6. Recording apparatus according to claim 1, further comprising:

said recording means being composed of a heater elements;

driving means for sequentially driving the heater elements by groups of k heater elements said; and power supply means for simultaneously supplying power to k heater elements in each group;

wherein said power supply means is operated in such a manner as to satisfy the following relation, $$n/k \times t_a \leq t_a + t_b$$

wherein $t_a$ is an interval while one heater element is being power supplied once and $t_b$ is an interval to be required for cooling the heater element after the power supply.

7. Recording apparatus according to claim 6, wherein said k is 1.

8. Recording apparatus according to claim 6, wherein said recording means includes p recording heads, each recording head being composed of m heater elements.

9. Recording apparatus according to claim 8, wherein said power supply means comprises first selection means for selecting one of the recording heads and second selection means for selecting one of the heater elements.

10. Recording apparatus according to claim 9, wherein said first selection means is composed of p signal lines and said second selection means is composed of m signal lines.

11. Recording apparatus according to claim 8, wherein said recording heads are respectively adapted to record different colors.

12. Recording apparatus according to claim 11, wherein said different colors are yellow, magneta and cyan.

13. Recording apparatus according to claim 6, wherein said heater elements discharge ink droplets upon the heating thereof.

14. Color image recording apparatus according to claim 1, wherein said first and second selection means operate in synchronism with a common clock signal.

* * * * *

UNITED STATES PATENT AND TRADEMARK OFFICE
CERTIFICATE OF CORRECTION

PATENT NO. : 4,775,868
DATED : October 4, 1988
INVENTOR(S) : SUSUMU SUGIURA

It is certified that error appears in the above-identified patent and that said Letters Patent is hereby corrected as shown below:

AT [56] IN REFERENCES CITED

U.S. Patent Documents, "Tazani et al." should read --Tazaki et al.--.

U.S. Patent Documents, "Tazani" should read --Tazaki--.

COLUMN 1

Line 39, "scanning. h) In" should read --scanning. In--.

COLUMN 3

Line 4, "3 (CNT2)" should read --33 (CNT2)--.
    Line 17, "respecitvely" should read --respectively--.
    Line 35, "ink those" should read --ink, those--

COLUMN 5

Line 6, "numbr" should read --number--.
    Line 41, "apparatus," should read --apparatus--.
    Line 43, "magneta" should read --magenta--.

UNITED STATES PATENT AND TRADEMARK OFFICE
CERTIFICATE OF CORRECTION

PATENT NO. : 4,775,868
DATED : October 4, 1988
INVENTOR(S) : SUSUMU SUGIURA

It is certified that error appears in the above-identified patent and that said Letters Patent is hereby corrected as shown below:

COLUMN 6

Line 3, "a heater" should read --n heater--.
Line 5, "the heater" should read --the n heater--.
Line 6, "elements said;" should read --elements;--.
Line 35, "magneta" should read --magenta--.

Signed and Sealed this

Sixteenth Day of May, 1989

Attest:

DONALD J. QUIGG

Attesting Officer    Commissioner of Patents and Trademarks